United States Patent Office 3,657,293
Patented Apr. 18, 1972

3,657,293
PRODUCTION OF ALKANOIC ACIDS
Robert J. Fanning, Baton Rouge, La., assignor to Ethyl Corporation, New York, N.Y.
No Drawing. Continuation-in-part of application Ser. No. 638,613, May 15, 1967. This application May 7, 1970, Ser. No. 35,583
Int. Cl. C08h 17/36
U.S. Cl. 260—413
10 Claims

ABSTRACT OF THE DISCLOSURE

Carboxylic acid of high purity and high stability is prepared by hydrogenative purification of a starting alkanol feed having from about 4 to about 30 carbon atoms per molecule by caustic fusing the alkanol to produce salts or soaps of the corresponding acids having from about 4 to about 30 carbon atoms per molecule, by stripping the salts to remove unsaponifiable materials, by converting the stripped salts to carboxylic acid by treatment with mineral acid solutions, and purifying the acid by a two-stage treatment of topping and flashing to remove light and heavy components present. Where the starting alkanol is a wide range mixture as regards molecular weight, the product acid is preferably distilled into narrow cuts and even individual molecular weight acids.

CROSS REFERENCE TO RELATED APPLICATIONS

This application is a continuation-in-part of application Ser. No. 638,613, filed May 15, 1967, now abandoned.

BACKGROUND OF THE INVENTION

Field of the invention

The invention pertains to the preparation of alkanoic acid having from about 4 to about 30 carbon atoms per molecule. In particular, the preferred acid produced is of normal or straight-chain carbon skeletal configuration with minor amounts of branched acid present; howover, also included as less preferred acid is branched-carbon skeletal acid having typically methyl or ethyl groups on a significant proportion of the molecules, typically up to about 50 percent of the molecules present. The acid produced is preferably saturated and free of internal functional groups such as keto or hydroxyl groups. Utility for such acid includes the preparation of bar soap and other soap products, the preparation of various types of esters, and numerous applications as intermediates in the preparation of chemical compounds.

Description of the prior art

The preparation in commercial quantities of high purity synthetic alkanoic acid of high stability as regards freedom from degradation on storage is something that has become a practical reality only very recently. On the other hand, there have been numerous attempts to produce synthetic acid extending backwards in point of time for more than fifty years. For the most part, the prior art processes and materials were severely limited by the vast quantities of impurities encountered and by the inadequacy of analytical techniques so that for the most part it was not possible to determine the exact nature of various impurities encountered so as to set about eliminating them either by purification techniques or by improved production techniques. Thus for the most part, there has been justification for the general conclusion that synthetic acid was and always would be inferior to naturally-derived carboxylic acid such as obtained from coconut oil and tallow fat and that it would be a considerable accomplishment to merely produce acid that would approach the characteristics of such naturally-derived acid.

It will thus come as a surprise to many to learn that processes have been evolved which will produce synthetic alkanoic acid in the range of about 4 to 30 carbon atoms per molecule which not only approaches the naturally-derived acid in terms of qualities and characteristics but which actually vastly exceeds the usual natural source acid in regard to purity when employing the most advanced analytical techniques which now exist. The new synthetic acid provides entirely new standards by which to judge other carboxylic acid. The new synthetic acid, particularly the preferred acid, has unique properties because of high purity and high stability.

SUMMARY OF THE INVENTION

Preferred synthetic alkanoic acid of high purity and excellent stability is produced by caustic fusing preferred high purity synthetic alkanol having from about 4 to about 30 carbon atoms per molecule corresponding to the desired acid and by distilling the product acid in such a way as to remove extremely light and extremely heavy materials that are present either from the outset as for example in unresolved esters or which are produced as by-products in the process apparently due to cracking or polymerization. An impotant aspect of caustic fusion not previously realized is the need for purification of feed alkanol to the greatest extent practical. Particularly is this true with regard to removal of internal functional groups such as keto- and hydroxyl groups but also unsaturation. Another important feature of the present invention resulting from purification of feed alkanol is the avoidance of any need for attempting the hydrogenation purification of product acid. In general, such a treatment is hampered by the inherent reactivity of carboxylic acid which causes the acid to be converted to non-acid molecules at a generally unacceptable rate whenever hydrogenation treatment conditions are made sufficiently severe as to be capable of converting the impurities. Even with this precaution, it has been found that by-products which appear to be related to resolution of esters even those present in minute quantities, or to various cleavage reactions and polymerization type reactions are formed during the various processing operations leading to the production of the acid. It has been found that these by-products are highly undesired contaminants and are of such nature as to be removable by simple, short contact time flashing operations that can be performed on the acid without adverse effects. One of such operations is a "topping" to remove light molecules which appear to be associated with resolution of esters in the feed alkanol or with cleavage products. Another operation is a "flashing" operation of the acid to leave as residue the higher boiling materials, that is, those with lower vapor pressure than the product acid. The necessity for the extensive purification of feed alkanol and the limitations upon the amount of chemical treatment purification permissible with the acid was surprising.

The caustic fusion reaction per se to convert alkanol into soaps of alkanoic acid of corresponding numbers of carbon atoms per molecule is a process which dates back many many years; however, as this process has been conducted in the prior art, it has been quite limited as to raw materials, and as a consequence, as to results. Generally the process has used low cost synthetic alkanol of comparatively low quality with much internal functionality and much branching. One source of such alkanol was the hydration of random olefin mixtures. Another source was the oxo process technology using random olefins. Apparently until now there was never any concerted effort to establish this process for dealing with normal alcohol of high purity. This is no accident but it is a matter dictated until now by economics because the only prior art source of high quality normal *alcohol* was from the hydrogenation conversion of corresponding *acid* obtained by splitting operations from natural materials such as coconut oil and tallow fat so that there was never any clear cut reason or justification for attempting to go backwards in producing fatty acid by the caustic fusion of naturally-derived alkanol. Now the situation is different with high quality synthetic alkanol available via aluminum chemistry at sufficiently low cost in high volume production to enable it to be considered for use as a feed stock for the production of synthetic alkanoic acid. It has been found that, by purifying the synthetic alkanol to an extremely high level and with attention to certain other factors, it is possible to use the caustic fusion process to produce synthetic alkanoic acid which is vastly superior to natural-source alkanoic acid, not only in terms of initial purity but also in terms of stability and resistance to degradation which is generally evidenced by the gradual development of undesired color and odor characteristics in acid.

In accordance with the basic teachings of the present invention, high quality synthetic acid is produced from alkanol which preferably is synthetic normal alcohol produced by aluminum chemistry. Such aluminum chemistry processing may include chain growth upon lower aluminum alkyl material such as triethyl aluminum to produce mixtures of higher trialkyl aluminum materials such as those with butyl, hexyl, octyl, decyl, dodecyl, tetradecyl, hexadecyl, octadecyl, eicosyl, docosyl, tetracosyl, hexacosyl, octacosyl, etc. Of course, these can be produced from displacement reactions with appropriate olefins. Such higher alkyl trialkyl aluminum materials are oxidized to corresponding alkoxides and the alkoxides hydrolyzed to the alkanols. It is to be understood that although the use of such a high quality starting synthetic alkanol is highly preferred for the highest quality acid that other types of alkanol such as those with some branching can be suitable for the present process as long as the properties of such materials are fully understood in accordance with the present teachings as well as the effect of the co-presence of such "impurity" materials. It is understood also that even naturally-derived alkanol such as that obtained from natural oils and fats, typically coconut oil and tallow, can be used in the present process despite the fact that such appears to be an economic impracticality when the preferred synthetic alkanol is available because the synthetic acid produced by means of the present process is a superior grade relative to the acid derived from natural source materials by the conventional prior art processes such as those typified by various splitting operations mentioned in the foregoing. Thus, for example, it is practical to convert low cost tallow fatty acid to corresponding tallow alcohol and purify it by a hydrogenation treatment, and then produce high quality saturated fatty acid superior to even triple pressed stearic acid.

The first step of the present process is a hydrogenation purification treatment of feed material seemingly to saturate the materials and to remove internal functionality such as that represented by internal olefinic linkages, secondary hydroxyl linkages, and keto groups. This is generally required even with high quality naturally-derived alkanol. It is pointed out that the elimination of such undesired functionality from the starting materials (alkanol) is not extremely difficult but that equivalent hydrogenative purification of the product acid is extremely difficult at best and as a practical matter cannot be preformed without production of impurity materials and loss of acid molecules.

The hydrogenation purification of the feed materials such as the preferred high quality synthetic alkanol is preferably accomplished in a co-catalyst system employing a finely-divided transition metal of Group VIII of the Periodic Table (Fisher Scientific, 1955) such as nickel together with an acid activated montmorillonite or bentonite clay catalyst system, typically "Filtrol" brand clay. Hydrogenation with such a dual catalyst system appears to accomplish concurrently the desired purposes of saturating carbonyl groups, of dehydrating internal hydroxyl linkages, and of saturating olefinic linkages, internal as well as terminal. Typically the conditions used are a temperature from about 100–160° C., preferably about 120° C. to about 130° C., typically 125° C. and a pressure from about 200 p.s.i.g. to 800 p.s.i.g., typically 500 lbs. p.s.i.g. Catalyst concentration and contact time are not critical; however, they do affect conversion extent and rate in a normal manner. Under the more severe of these conditions, a small percentage of feed alkanol is generally converted to paraffins; however, such byproducts are readily removed in a latter step of the process (soap stripping) so that such materials are not carried through in admixture with the final product acid. Such easy removal of impurities is not possible with the product acid per se. It appears that the copper chromite hydrogenation usually employed in the production of natural source alkanol is less effective than a nickel containing system for the present purification.

Following the purification, the feed materials are subjected to a fusion reaction with molten caustic, typically sodium hydroxide, at elevated temperatures and pressures whereby the alkanol is converted to the soaps or salts of corresponding alkanoic acid.

The caustic used can be any substantially anhydrous alkali metal or alkaline earth metal hydroxide or oxide. Typical caustic compounds are the oxides and hydroxides of lithium, sodium, potassium, rubidium, cesium, francium, magnesium, calcium, strontium, barium and radium. Of these, the compounds of the alkali metals are preferred because of solubility of the organic salts (soaps).

Particularly preferred for cost and reactivity reasons are the oxides and hydroxides of sodium and potassium, individually and in mixtures, with sodium hydroxide being the most preferred.

The caustic fusion reaction is generally conducted at a temperature from about 175° C. to about 400° C., a preferred range being from about 300 to about 350° C., particularly where the caustic used is sodium hydroxide.

The preferred conditions for the caustic fusion reaction include a temperature of about 330° C. at a presssure of the order of 60–1000 p.s.i.g. employing alkanol and caustic in about a mol to mol stoichiometric ratio. The time for this reaction is comparatively short, typically of the order of 15 minutes to ½ hour at the typical temperature and pressure and the conversion achieved is essentially stoichiometric as regards the conversion of primary hydroxyl groups ($RCH_2OH$) to alkanoic acid soap groups ($RCOONa$). Typical conversions when using the preferred high quality aluminum chemistry derived alkanol easily run in the order of 97–98 percent of the feed alkanol delivered to the caustic fusion step.

It is preferred that the soaps produced by the fusion operation be stripped with steam while still in the initial molten form at about the temperature of the fusion reaction as previously set forth to remove low boiling neutral materials. Typically these impurities include all unreacted starting materials.

Typically the stripping is accomplished while maintaining the soap at a temperature of about 330° C. at about atmospheric pressure and with the exclusion of oxygen.

The stripped soap is of high quality and purity and may be used directly in many ways. This soap is a very unusual material in comparison to the ordinary commercial soap materials produced by saponification or neutralization of naturally-derived materials because of the anhydrous nature and also because of extremely high purity as regards freedom from unsaturation and internal functionality and contamination by non-soap molecules. This soap is usable directly in a soap-making process, for example, wherein it is combined with tallow-derived materials to produce superior soap somewhat similar to the conventional 80/20 tallow-range coconut materials of familiar bar soap.

In producing acid, the stripped molten soap is preferably hydrolyzed immediately by direct addition to a 15 percent sulfuric acid aqueous solution maintained at about 95–100° C. which effects the conversion of the soaps into acids. Although the exact acid concentration is not critical, it is preferred that the aqueous solution used in hydrolysis be saturated as to the by-product sodium sulfate so that as the by-product sodium sulfate is formed it crystallizes out and is easily recovered by filtration operation at a typical temperature of about 70° C. The aqueous mother liquor remaining from the filtration is recycled to hydrolysis to maintain the saturated solution as regards sodium sulfate used in hydrolysis. The crude acid is taken from the filtration operation as an oily phase, washed with water to remove residual sodium sulfate and sulfuric acid and then subjected to at least a two-step flashing operation.

The first flashing step (topping) is at a temperature of about 170° C. and a pressure of about 1–5 millimeters of mercury and removes as an overhead a small quantity of acidic material which appears to originate by cleavage of starting materials. Typically, the amount of material taken overhead in a system such as the foregoing is approximately 2–5 percent and is mostly the lighter acid chains plus any residual dissolved water present from the water washing step.

Following the first flashing step, the acid is subjected to a second flashing operation in which the desired product acid is taken as an overhead stream leaving a residue of lower vapor pressure acidic materials contained in a concentrated fraction. It is believed that these low vapor pressure materials arise during the fusion step through a Guerbet-type reaction or some other form of polymerization which produces branched dimer alkanol which then "caustic fuses" to produce branched dimer soaps that are converted to high molecular weight acid in the acidification step.

When the preferred materials, as described in the foregoing, are given the preferred treatment as described in the foregoing, the product acid is of a quality which is vastly superior to commercially available alkanoic acid derived from natural source materials. For example, typical iodine values are 0.1 or lower in comparison with .5 to 5 minimum for natural acid. Evidence of the high quality of the synthetic acid is the fact that the ordinary testing techniques used for measuring color and odor characteristics and stability properties of "natural source" acid are almost useless for control purposes when dealing with the present synthetic materials produced by the complete present process.

A severe stability test is used in evaluating the present product materials. Those familiar with test procedures for naturally-derived acid will be impressed by the severity of the present test conditions.

In the present testing, benzene of high grade (thiophene free) and which has been previously washed with concentrated sulphuric acid is used for phase coordination. A 15 gram sample of the organic acid to be tested is heated to a temperature of 95–100° C., or more generally, above the melting point, and added to a 15 ml. portion of acid-washed benzene maintained at a temperature of about 35–40° C. A 21 ml. sample of the mixed acid-benzene solution is heated to 70° C. and then added to 7 ml. of concentrated (95–98 percent) sulphuric acid in a 2 ounce square bottle. The mixture (single phase) is shaken for 1 minute and placed in a water bath at the temperature of boiling water and held there for 20 minutes. The color of the mixture is then compared with a color standard such as the Gardner scale and rated according to the result.

Acid produced by the foregoing process corresponds substantially to the starting alkanol in terms of carbon atoms per molecule. Thus the product acid distribution can be controlled either by selecting the feed alkanol as individual alkanols or cuts or by employing a wide range feed alkanol mixture and distilling the product acid into cuts or individual acids as desired. Although the distillation of acids is more difficult than that of alkanols, it permits continuous operation of the preceding steps without requiring cleaning when the feed materials are changed so as to produce different product acids.

In addition, the wide molecular weight range feed system is frequently preferred because it avoids problems encountered in performing the fusion reaction with lighter alkanols such as those in the 4–8 carbon atoms per molecule range and with heavier alkanols such as those in the 18-"plus" range of carbon atoms per molecule. The lighter alkanols have a pronounced tendency toward foaming during the fusion reaction and in hydrolysis while the heavier alkanols have a high melting point requiring handling as solids or heated feed lines and because of high viscosity introduce numerous problems in treatment of the soaps and hydrolysis to acid.

The preferred wide range alkanol feeds ranging from about 4 to 20 carbon atoms per molecule, with some intermediate peaking, typically in the 12–14 region, are liquid and have a mobility which facilitates the various processing operations as well as the handling of the resultant soaps.

The foregoing process can selectively produce straight chain acid and soap mixtures from mixed normal-branched alkanol feed by proper conditions, typically using a caustic to alkanol mol ratio of 1 to 1 based on the normal alkanol content of the feed alkanol instead of the total alkanol. Where the caustic to alkanol proportion is about 1 to 1 based on the total feed alkanol the result is non-selective conversion of both the normal and branched alkanol to correspond acid molecules. The generally slower conversion rate for branched alkanol to branched acid usually requires a significantly longer reaction time than with the normal only alkanol feed.

Where natural source alkanol is used as a feed, benefits accrue from the fact that a high degree of purification of the feed alkanol is attainable without concern over a few percent conversion of alkanol to paraffin because such paraffin is readily removable in the soap stripping step. Thus, there is no need to attempt to purify product acid per se by hydrogenation techniques.

EXAMPLE I

A 7000 gram cut of synthetic hexadecanol and octadecanol was hydrogenated with a co-catalyst system containing 875 grams of approximately 60 mesh activated clay (Filtrol brand) and nickel on a support material (Harshaw Ni–0104T ⅛″). The latter is a pelletized catalyst as charged; however, in the actual stirred autoclave used, the agitator pulverized the pellets providing in effect a slurry system. The reactor was a 5-gallon nickel-lined autoclave with a turbine-type agitator operative at 100 r.p.m. Hydrogen was bubbled in at the bottom through a ⅛″ diameter pipe. A pressure regulator vented the system through a bubbler providing a sweep. Hydrogen rate was approximately ½ liter per minute reduced to S.T.P. The hydrogenation time was 4 hours at 800 p.s.i.g. and 120° C.

The starting alkanol analyzed as follows.

ALKANOL ANALYSIS

| Carbon atom per molecule | Weight percent (by VPC) | |
|---|---|---|
| | Normal | Branched |
| 12 | 0.05 | |
| 14 | 1.29 | |
| 16 | 51.11 | 0.32 |
| 18 | 42.27 | 5.69 |
| 20 | 0.17 | 1.10 |

WET CHEMICAL ANALYSES

| | Before hydrogenation | After hydrogenation |
|---|---|---|
| Hydroxyl, wt. percent | 6.97 | |
| Carbonyl oxygen, percent | 0.012 | 0.004 |
| Iodine number, cg./gram | 0.67 | 0.54 |
| Percent paraffin | 0.68 | 5.95 |
| Color (APHA) | 30 | 15 |

At the conclusion of the treatment the system was cooled but maintained as a liquid, the pressure released, and filtered. The purified alcohol was then analyzed showing the "after" results above.

A 275 gram portion of the purified alkanol was then reacted with NaOH in a 1 liter nickel-lined autoclave provided with a turbine type agitator operative at 750 r.p.m. NaOH was used on the basis of a 1:1 mol ratio of the normal alkanol content to caustic. The temperature was 330° C., pressure 400 p.s.i.g. and time 72 minutes. Hydrogen and water evolved were released through a pressure regulator set at 400 p.s.i.g.

The pressure was released gradually and temperature maintained at about 330° C. while steam was bubbled in at the bottom of the reactor for 20 minutes. The condensate was collected and the 20 minute period corresponded to the termination of evolution overhead of organic phase material.

The reaction mass was then cooled, solidifying and chipped out of the reaction, pulverized to about 30 mesh. Approximately 225 grams of stripped soap was recovered.

The pulverized soap was added to 1000 grams of a 30 percent aqueous $H_2SO_4$ solution at 95–100° C. in a 2-liter creased flask provided with agitation at about 300 r.p.m. The reaction was continued for approximately 30 minutes at which time it was adjudged, as evidenced by the formation of two clear phases upon brief cessation of agitation, for completion of reaction.

The lower inorganic layer was drained and the acids washed three times each with approximately equal volumes of water and using the agitator. At the end of each wash the inorganic phase was drained off.

The wet fatty acid was dried by contact with 10 percent by weight of powdered anhydrous magnesium sulfate, filtered and obtained as a clear filtrate.

The signficant analyses at this point were.

Acid number (mg. KOH/gram) _____ 202
Ester value (mg. KOH/gram) _____ 0.1
Carbonyl oxygen (wt. percent) _____ 0.23
Iodine number (cg./g.) _____ 0.40
Color (APHA) _____ 20

EXAMPLE II

Example I was repeated using a 5 gallon fusion autoclave with substantially the same purified feed alkanol and providing substantially the same washed acid in larger volume.

A 1204 gram sample of the washed acid was charged to a 2 liter glass distillation flask heated with an oil bath. The acids were heated to a vapor temperature of 148° C. at approximately 3 mm. of mercury pressure taking overhead a 61 gram distillate which was collected and put in a separate container.

Next a middle cut of 1046 grams of acid was taken overhead to a final vapor temperature of 187° C. A residue of 55 grams of dark colored material remained in the flask. Losses of 37 grams (3 percent) were attributed to light ends not condensed in the first cut.

The middle cut had the following properties.
Acid number (mg. KOH/gram) _____ 207
Ester value (mg. KOH/gram) _____ <0.8
Iodine value (cg./gram) _____ 0.1
Carbonyl oxygen (wt. percent) _____ 0.01
Water (wt. percent) _____ 0.031
Unsaponifiables (wt. percent) _____ 0.11
Color AOCS (after heating 2 hours
at 205° C. under nitrogen) _____ {<1 at 440 mµ
{<1 at 550 mµ

Acids at various stages were given a stability test with $H_1SO_4$ as described in the foregoing.
The following results were indicated.

Gardner color scale
Washed acid _____ 15
Fore cut _____ 14
Center cut _____ 13
Tail cut (residue) _____ >18

In a comparative example a center cut was derived as in the foregoing; however, the hydrogenation purification step was omitted. The center cut had a color of 16 on the Gardner scale.

Several high quality commercial brands of triple pressed stearic acid were given a stability test as described herein. All rated higher color than the Gardner 13 of the center cut above.' One rated 14, two rated about 13.5.

EXAMPLE III

The hydrogenation, fusion, acidification and wash procedure of the preceding examples were repeated in a 1 liter size system using a wide range alkanol of the following composition based on VPC analysis which is shown as reported without normalization to 100 percent. Caustic was stoichiometric 1:1 based on total alkanol.

| | Wt. percent | |
|---|---|---|
| Alkanol, carbon atoms per molecule | Straight chain | Branched chain |
| 6 | 2.82 | |
| 8 | 5.61 | 0.22 |
| 10 | 7.08 | 0.09 |
| 12 | 31.07 | 0.51 |
| 14 | 20.91 | 0.56 |
| 16 | 11.40 | 0.46 |
| 18 | 5.65 | 0.57 |
| 20 | 1.97 | 0.46 |
| 22 | 0.99 | 0.25 |
| 24 | 0.16 | 0.25 |
| Total | 87.66 | 3.27 |

Hydroxyl number (wt. percent) _____ 8.33
Iodine number cg./gram _____ 0.8
Water (wt. percent) _____ 0.046

Washed acids had the following composition (as reported—not normalized to 100 percent).

| | Wt. percent | |
|---|---|---|
| Acids, carbon atoms per molecule | Straight chain | Branched chain |
| 6 | 3.00 | |
| 8 | 6.49 | |
| 10 | 8.13 | |
| 12 | 33.67 | 0.10 |
| 14 | 21.87 | 0.31 |
| 16 | 11.24 | |
| 18 | 5.25 | |
| 20 | 1.17 | |
| Total | 90.82 | 0.41 |

The washed acids were topped and flashed to remove materials more volatile than hexanoic acid and less volatile than tetracosanoic acid.

Product acid had the following wet chemical analysis.
Acid number (mg. KOH/gram) _____ 267
Ester value, mg. KOH/gram) _____ <0.8
Iodine value (cg./gram) _____ 0.4
Carbonyl oxygen (wt. percent) _____ 0.015
Color (APHA) _____ 10

I claim:
1. A process for producing synthetic alkanoic acid having from about 4 to about 30 carbon atoms per molecule from corresponding alkanols having from 4 to about 30 carbon atoms per molecule comprising
pretreating feed alkanol containing impurities having internal olefinic linkages, secondary hydroxyl linkages or keto groups by a catalytic hydrogenation treatment using a co-catalyst system of a transition metal of Group VIII of the Periodic Table and acti- vated clay selected from the group consisting of montmorillonite and bentonite clays at a temperature from about 100° C. to about 160° C. and at a pressure from about 200 p.s.i.g. to about 800 p.s.i.g., reacting the treated alkanol with molten caustic at elevated temperatures from about 175° to about 400° C. at a pressure of about 60–1000 p.s.i.g. and in a mol ratio of about 1 to 1 based on the total feed alkanol whereby feed alcohol is converted to alkanoic acid soap, stripping the soap while in the molten state with steam at about the temperature of said reacting step and about atmospheric pressure and with the exclusion of oxygen to remove volatile non-soap materials, converting the soap to organic acid by treating with dilute sulfuric acid at about 95–100° C., and flashing the acid to remove materials of low vapor pressure.

2. The process of claim 1 wherein the temperature of the reacting step is from about 300 to about 350° C. and the caustic is sodium hydroxide.

3. The process of claim 1 wherein the temperature of the reacting step is about 330° C. and the caustic is sodium hydroxide.

4. The process of claim 1 for producing straight chain carbon skeleton acid of high purity wherein the feed alkanol is derived from tallow by splitting followed by hydrogenation.

5. The process of claim 1 wherein the hydrogenation treatment employs a co-catalyst system of nickel and activated bentonite type clay.

6. The process of claim 1 for producing straight chain carbon skeleton alkanoic acid wherein the feed alkanol is synthetic normal alcohol of high purity derived by processing which includes the generation of an aluminum alkyl material whose alkyl groups correspond substantially to the carbon skeletons of the desired alkanoic acid, oxidation of the aluminum alkyl material to aluminum alkoxide material, and hydrolysis of the aluminum alkoxide material to alkanol.

7. The process of claim 1 for producing straight chain carbon skeleton acid with a minor percentage of branched acid molecules wherein the feed alcohol is mixed normal and branched synthetic alcohol derived by reaction of olefins, carbon monoxide and hydrogen and the fusion reaction is conducted with substantially unity stoichiometric caustic to alcohol ratio based on the normal alcohol content of the feed alcohol to preferentially react to soap the normal alcohol and wherein unreacted branched alcohol is removed from the soap in the stripping operation.

8. The process of claim 1 for producing straight chain carbon skeleton acid of high purity wherein the feed alcohol is derived from coconut oil by splitting followed by hydrogenation.

9. The process of claim 1 wherein the hydrogenation treatment employs a co-catalyst system of nickel and activated montmorillonite type clay.

10. The process of claim 1 for producing synthetic alkanoic acid having from about 12 to about 20 carbon atoms per molecule from corresponding alcohol wherein the acids are also purified by a topping distillation to remove a forecut of low boiling materials of higher vapor pressure than the desired acid.

References Cited
UNITED STATES PATENTS

| | | | |
|---|---|---|---|
| 2,801,977 | 8/1957 | Morway et al. | 260—531 C X |
| 3,407,220 | 10/1968 | Williams et al. | 260—413 |
| 3,558,716 | 1/1971 | Engelhardt | 260—531 C X |
| 3,560,537 | 2/1971 | Eller | 260—413 |
| 3,579,552 | 5/1971 | Craddock et al. | 260—413 |
| 3,579,551 | 5/1971 | Craddock et al. | 260—413 |

LEWIS GOTTS, Primary Examiner

E. G. LOVE, Assistant Examiner

U.S. Cl. X.R.

260—531 C